United States Patent
Corazza et al.

(10) Patent No.: US 11,524,494 B2
(45) Date of Patent: Dec. 13, 2022

(54) METHOD FOR MAKING A LAYERED STRUCTURE EMBEDDING THREE-DIMENSIONAL ELEMENTS MADE OF CRYSTAL GLASS OR PRECIOUS STONES

(71) Applicant: VITRIK S.r.l., Prata di Pordenone (IT)

(72) Inventors: Diego Corazza, Prata di Pordenone (IT); Andrea Comparin, Prata di Pordenone (IT)

(73) Assignee: VITRIK S.R.L., Prata di Pordenone (IT)

( * ) Notice: Subject to any disclaimer, the term of this patent is extended or adjusted under 35 U.S.C. 154(b) by 43 days.

(21) Appl. No.: 17/286,804

(22) PCT Filed: Nov. 15, 2019

(86) PCT No.: PCT/IB2019/059842
§ 371 (c)(1),
(2) Date: Apr. 19, 2021

(87) PCT Pub. No.: WO2020/104907
PCT Pub. Date: May 28, 2020

(65) Prior Publication Data
US 2021/0354432 A1    Nov. 18, 2021

(30) Foreign Application Priority Data

Nov. 21, 2018  (IT) .................. 102018000010487

(51) Int. Cl.
*B32B 17/06* (2006.01)
*B44F 1/06* (2006.01)
(Continued)

(52) U.S. Cl.
CPC ............ *B32B 37/003* (2013.01); *B32B 3/085* (2013.01); *B32B 7/12* (2013.01); *B32B 9/002* (2013.01);
(Continued)

(58) Field of Classification Search
CPC . B44F 1/06; B44F 1/066; B44C 1/105; B44C 5/005; B32B 17/10871; B32B 37/06; B32B 2318/04
See application file for complete search history.

(56) References Cited

U.S. PATENT DOCUMENTS 6,322,862 B1 *  11/2001  Sakai ................... B44C 5/06
                                              428/354
2006/0046017 A1 *  3/2006  Adickes ............ B32B 17/10247
                                              428/542.2

FOREIGN PATENT DOCUMENTS

DE    201 14 725 U1    3/2002

OTHER PUBLICATIONS

Jan. 24, 2020 Search Report issued in International Patent Application No. PCT/IB2019/059842.
(Continued)

*Primary Examiner* — Scott W Dodds
(74) *Attorney, Agent, or Firm* — Oliff PLC

(57) ABSTRACT

A method for making a layered structure without any defects, including a first support layer, a second support layer, and an adhesive intermediate layer interposed between the first layer and the second layer which is adapted to fix the layers on each other. The intermediate layer embeds operatively at least a three-dimensional macroscopic element being made of crystal glass or precious stones, and the intermediate layer is made of a thermoplastic resin having a melting temperature.

13 Claims, 3 Drawing Sheets

(51) Int. Cl.
*B32B 37/06* (2006.01)
*B32B 37/00* (2006.01)
*B32B 3/08* (2006.01)
*B32B 7/12* (2006.01)
*B32B 9/00* (2006.01)
*B32B 17/10* (2006.01)
*B32B 37/10* (2006.01)
*B32B 37/12* (2006.01)
*B44C 5/00* (2006.01)
*B44C 1/10* (2006.01)

(52) U.S. Cl.
CPC .... *B32B 17/10036* (2013.01); *B32B 17/1077* (2013.01); *B32B 17/10247* (2013.01); *B32B 17/10788* (2013.01); *B32B 17/10871* (2013.01); *B32B 17/10935* (2013.01); *B32B 17/10972* (2013.01); *B32B 37/06* (2013.01); *B32B 37/1018* (2013.01); *B32B 37/12* (2013.01); *B32B 2305/34* (2013.01); *B32B 2307/306* (2013.01); *B32B 2307/412* (2013.01); *B32B 2309/025* (2013.01); *B32B 2318/04* (2013.01); *B32B 2451/00* (2013.01); *B44C 1/105* (2013.01); *B44C 5/005* (2013.01); *B44F 1/066* (2013.01)

(56) References Cited

OTHER PUBLICATIONS

Jan. 24, 2020 Written Opinion issued in International Patent Application No. PCT/IB2019/059842.

* cited by examiner

METHOD FOR MAKING A LAYERED STRUCTURE EMBEDDING THREE-DIMENSIONAL ELEMENTS MADE OF CRYSTAL GLASS OR PRECIOUS STONES

TECHNICAL FIELD OF INVENTION

The present invention refers to a method for making a layered structure, such as preferably a layered glass. Specifically, the present invention refers to a method for making a layered structure embedding three-dimensional elements of crystal glass or precious stones such as rhinestones, gems, diamonds and the like.

BACKGROUND OF THE INVENTION

Layered structures such as for example layered or multilayer glass, that comprise at least two layers of glass, or other material, and an adhesive intermediate layer interposed between said two layers, are well-known in the prior art.

Typically, layered glass is made by inserting the adhesive intermediate layer between the two layers of glass under the combined action of heat and pressure for the purpose of fixing the surfaces of the intermediate layer to the glass layers. Specifically, the adhesive intermediate layer is generally made with a transparent thermoplastic resin, also having appropriate characteristics of adhesiveness.

When formed, layered glass has a "sandwich" structure, that is, it behaves like a single whole and, generally, has the transparent appearance of common glass; alternatively, the appearance is semi-transparent or opaque, depending on the characteristics of the glass layers and of the intermediate layer.

Moreover, by modifying the number of layers and their thickness it is possible to obtain various types of layered glass. In fact, the intermediate layer provides appropriate characteristics to the layered glass, that is, it contributes particular further characteristics compared to those of plain glass sheets. For example, the intermediate layer is adapted to increase the mechanical properties of glass for vehicles so as to improve its safety in case of breakage.

In recent years, layered glasses are used to make elements in various fields, such as for example walls or windows in the building industry, support shelves, partition elements or walls in the furniture field, and the like. Alternatively, layered glasses are used to make equipment covers such as, for example, lighting devices, or projection screens. Moreover, in accordance with the development of the applications, standardized regulations have been defined with the purpose of characterizing the mechanical properties of layered glass, such as for example EN 12600:2004 for the building industry.

As the number of applications increases there is a consequent increase in the number of characteristics required of the layered glass, such as for example decorative characteristics and/or functional characteristics, guaranteeing at the same time mechanical properties in accordance with the regulatory requirements for the field of application.

In fact, in some applications it may be desirable that the layered glass, having appropriate mechanical properties, is also provided with a decoration, a decorative pattern, an image, a colour or the like.

Layered glass provided with a colour motif is known, and is generally obtained by means of a coloration of the intermediate layer and/or of the glass sheets.

Alternatively, layered glass provided with decorations or images is generally obtained by applying on a surface of the intermediate layer a film/web having an appropriate decoration/print which, therefore, is interposed between the layers forming the "sandwich". In other words, layered glass obtained in this manner is provided with a film/web of substantially bidimensional structure, that is, provided with a bidimensional element.

In this state, the layered glass may fail to guarantee appropriate decorative, optical or functional characteristics since the bidimensional element could be not perceptible when the layered glass is seen from angles that are flush with its surface.

Moreover, a bidimensional element may not act appropriately with a light used to illuminate the layered glass, that is, it does not reflect or scatter the light in an appropriate manner to provide depth to the visual effect, which could be an important aspect of the decorative, optical or functional characteristic of layered glass.

Specifically, this case occurs when it is necessary to combine the characteristics of the layered glass with additional characteristics, such as reflectivity, transmittance, the refraction index, luminescence, colour, etc., which are associated with one or more surfaces of a three-dimensional element, preferably macroscopic, that is embedded in the intermediate layer.

For example, it may be desirable to make a layered glass, provided with one or more three-dimensional macroscopic elements made of crystal glass or precious stones, having decorative optical or functional characteristics provided by the configuration, the dimensions, the material or the function of the three-dimensional macroscopic elements.

However, making layered glass embedding three-dimensional macroscopic elements proves to be complex when conventional methods are used.

Generally, layered glass is made with a conventional process in which, first of all, glass sheets are cleaned to eliminate the risk of low adhesiveness of the layers in the product.

Subsequently, one or more bidimensional elements, for example decorative ones, and a layer of transparent adhesive resin, that is, an intermediate layer, are arranged between the glass layers. If necessary, using suitable equipment, the excess parts of the intermediate layer with respect to the dimension of the product are removed.

Then, the "sandwich" or "multilayer", is subjected to heating and calendering processes to force the layers to adhere to each other and activate the adhesive properties of the thermoplastic resin of the intermediate layer so as to make the layers integral to each other.

This process, which is suitable for making layered glass embedding bidimensional elements, has however drawbacks during making layered glass embedding three-dimensional macroscopic elements.

In fact, the product made with the traditional processes contains cavities, such as air inclusions, embedded both within the intermediate layer and at the surface separating the three-dimensional macroscopic element and the intermediate layer, resulting in a layered glass that contains defects and is not in accordance with requirements.

These cavities are generated during the heating phases of the intermediate layer since the spatial configuration and the dimensions of the three-dimensional macroscopic element favour the inclusion of air during the heating phases of the forming process.

In fact, when bidimensional elements are used, they are arranged so that their surface area is completely in contact with the surfaces of the layers that form the layered glass. However, this does not occur when three-dimensional macroscopic elements are used since, before a heating phase, the intermediate layer is in contact only with one portion of the whole surface area of each three-dimensional element, leaving gaps that are relatively extensive and therefore tend to include air during the forming process.

Moreover, this drawback is particularly evident when, with a need to embed relatively large three-dimensional macroscopic elements, it is necessary to form an intermediate layer having a relatively large thickness obtained by superimposing a plurality of distinct intermediate layers, and thus increasing as a consequence the probability of forming gaps tending to include air during the forming process.

In fact, typically, the intermediate adhesive layers are marketed in the form of sheets, or rolls, having preset thicknesses and not adapted to embed relatively large three-dimensional macroscopic elements. For example, the intermediate adhesive layers are marketed as sheets having a thickness of 0.3 mm, and the three-dimensional macroscopic elements have preferably dimensions greater than 1 mm.

Note that in layered glass the cavities, that is the air inclusions, are the cause of defects since they define a discontinuity that is visible to the naked eye and that deteriorates the decorative, optical and functional characteristics of the product. Specifically, the presence of cavities modifies both the degree of transparency of the intermediate layer and the decorative, optical or functional characteristics of the three-dimensional macroscopic elements embedded in it. In addition, the cavities generate zones of weakness in the structure, reducing the degree of adhesiveness of the intermediate layer to the glass layers and, consequently, deteriorating the mechanical properties of the layered glass.

Moreover, especially in the forming phases in which pressures are applied, the presence of three-dimensional macroscopic elements induces tensioning stresses that can cause a breakage of the glass layers. In fact, the configuration and the spatial dimensions of the three-dimensional macroscopic element generate, during the forming process, force gradients that remain in the structure of the layered glass and cause its breakage in the forming phase or in moments subsequent thereof.

This drawback is particularly evident when, having to embed relatively large three-dimensional macroscopic elements, it is necessary to form a relatively thick intermediate layer. In fact, without wanting to be bound to any theory, in this case there is an increased probability of generating, during heating and cooling in the forming process, a lack of temperature homogeneity in the structure of the layered glass that generates force gradients which cause, in turn, tensioning stresses.

Moreover, the three-dimensional macroscopic elements are arranged within the layered glass to form an appropriate preset pattern, that is, according to a design, so as to form a geometrical shape, an inscription, a drawing, or are randomly arranged within a determined interval.

However, during the forming phase, the three-dimensional macroscopic elements do not maintain their position with respect to the position established in the design phase. In other words, without wanting to be bound by any theory, the forces applied on the three-dimensional macroscopic elements during the forming process induce displacements of the same with respect to the arrangement provided by design due to the presence of the separation gaps from the intermediate layer, and to the relatively high thickness of the intermediate layer itself. This drawback is not present when bidimensional elements are used since, in this case, their surface area is completely in contact with the layer on which they rest and with the intermediate layer and, therefore, they are maintained in a fixed position during the forming process by means of friction.

Consequently, there is the necessity of developing a method with which can be made a layered structure, such as for example a layered glass, which overcomes the previously described drawbacks. Specifically, there is the necessity of developing a method for making a layered structure embedding three-dimensional macroscopic elements made of crystal glass or precious stones that overcomes the previously described drawbacks.

SUMMARY OF THE INVENTION

An objective of the present invention is to develop a method whereby a layered structure can be made, such as for example a layered glass, embedding three-dimensional macroscopic elements made of crystal glass or precious stones, decorative and/or functional, that is adapted to prevent the formation of defects that cause the deterioration of the decorative, optical, functional and mechanical characteristics of the product.

In the scope of the above objective, one purpose relates to the development of a method whereby a layered structure can be made in which the thickness of the intermediate layer can be adjusted so as to adequately embed three-dimensional macroscopic elements having relatively large dimensions.

A further objective regards the development of a method whereby a layered structure can be made wherein embedded cavities, that is air inclusions, aren't provided in the intermediate layer and at the separation surface between the three-dimensional macroscopic elements and the intermediate layer.

A further objective regards the development of a method whereby a layered structure can be made wherein is inhibited the formation of tensioning stresses that would cause breakages in the forming phase or afterward.

A further objective regards the development of a method with which to make a layered structure in which is inhibited the displacement of the three-dimensional elements with respect to a preset pattern established according to a design.

Finally, a further objective regards the development of a method with which to make a layered structure wherein the intermediate layer has an optical quality, such as transparency, adapted to avoid altering the decorative, optical or functional characteristics of the three-dimensional elements embedded in it.

The above objective and purposes, and others that will be more evident in the description which follows, are achieved by means of a method as defined in claim 1 for making a layered structure comprising decorative and/or functional three-dimensional macroscopic elements made of crystal glass or precious stones.

BRIEF DESCRIPTION OF THE DRAWINGS

Further characteristics and advantages of the method of the present invention, used to make a layered structure embedding three-dimensional macroscopic elements made of crystal glass or precious stones, will become more evident in the description which follows relative to embodiments provided purely by way of example, without limitations, with reference to the following figures, wherein.

DETAILED DESCRIPTION OF THE INVENTION

Figure 1A:
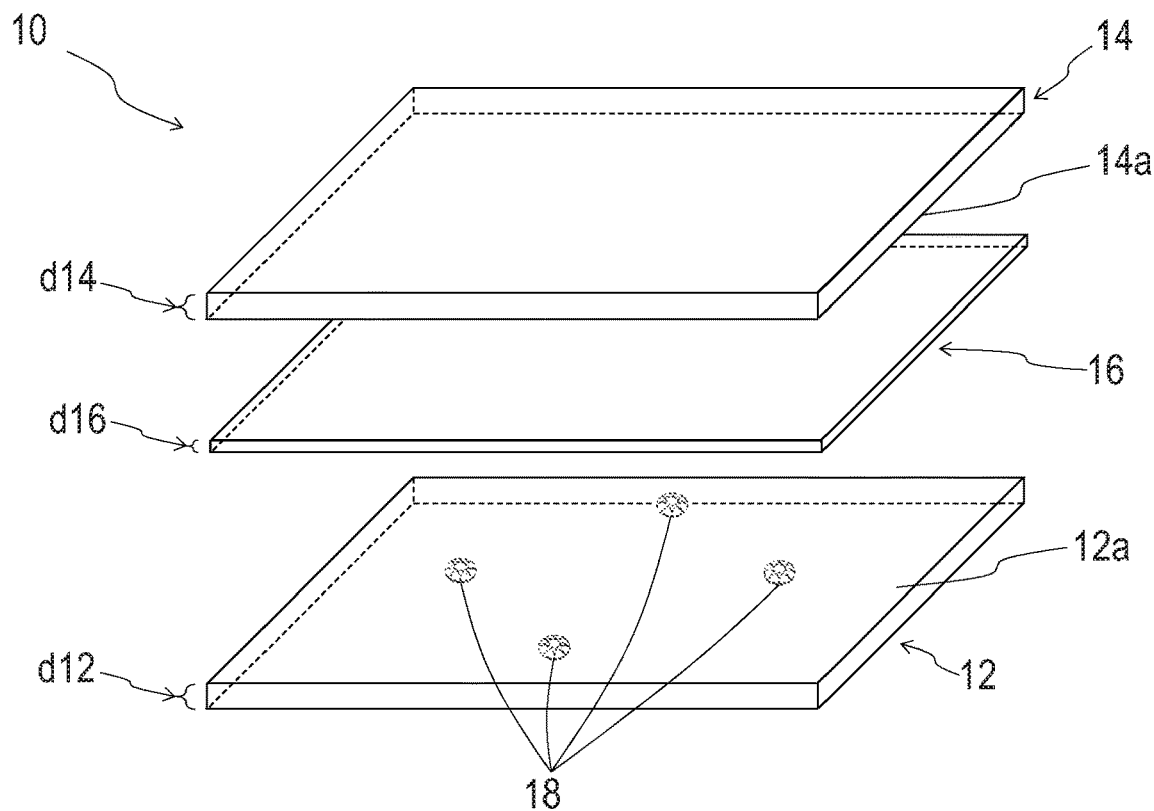
FIG. 1A is an exploded perspective drawing of a layered structure embedding three-dimensional macroscopic elements made of crystal glass or precious stones, in a preferred embodiment of the present invention.

In the present description, the term "layered structure" refers to a multilayer structure comprising at least two support layers formed with a rigid material, and an intermediate layer formed with an adhesive thermoplastic resin, preferably transparent, that is fixed and interposed between the two support layers.

In the preferred embodiment, the layered structure is a layered glass in which the two support layers are formed with glass and the intermediate layer is formed with a Ethylene-Vinyl-Acetate copolymer (EVA), however, this embodiment is not limitative. In fact, it is possible to provide a further embodiment wherein the first support layer is formed with a metallic or ceramic material, such as marble, granite or similar materials, while the second support layer is formed with glass.

Moreover, in the present description, the term "glass layer" refers to a layer formed with common glass or formed with a glass comprising a surface coating that is adapted to appropriately reflect portions of the light radiation such as UV, visible or infrared radiation, or the surface coating is electrically conductive. For example, in the preferred embodiment, the first and the second support layer are formed with common glass, however it is possible to provide for a further embodiment in which the first support layer is formed with a glass having a coating that reflects the visible portion of the light radiation, known as "mirror-glass", and the second glass layer is formed with common glass. The glass layer may possibly be transparent, semi-transparent or coloured and/or is provided with a surface embossing.

In the preferred embodiment of the present invention, the layered glass has a substantially flat shape, however, this is not limitative and the layered glass can be formed, depending on the application, in any suitable shape. For example, it may be shaped so as to have a curved concave and/or convex cross section along one or more of its axes, or the cross section may have a shape as a broken line, or the like. The methods for shaping the glass layers are known in the prior art.

Moreover, in the present description, the term "thermoplastic resin" refers to a material comprising in its composition at least one adhesive thermoplastic resin appropriate for making a layered glass. In the preferred embodiment of the present invention, the preferred thermoplastic resin is a Ethylene-Vinyl-Acetate copolymer (EVA), however, the thermoplastic resin can be a thermoplastic polyurethane (TPU), or the like. The thermoplastic resin may possibly include additives and/or curing agents and/or colouring agents to provide, for example, durability to the ultraviolet radiation, transparency to the material and a coloration. From the point of view of the characteristics of adhesiveness to the surface of a glass layer, the preferred thermoplastic resin is EVA, although this selection is not limitative.

In addition, in the present invention, the term "bidimensional element" refers to an element or object of substantially planar shape, in which one of its dimensions such as height, width or length is smaller by orders of magnitude with respect to the other dimensions. Similarly, with the term "three-dimensional element" reference will be made to an element or object wherein none of its dimensions is smaller by orders of magnitude than the other ones.

Specifically, in the preferred embodiment the three-dimensional element is an object having a polyhedric shape, however this embodiment is not limitative and the three-dimensional element can be a crystal glass, a diamond, a gem, a mineral, a rhinestone, a precious stone, a metallic or polymeric object having an appropriate cut, such as a diamond cut, Swarovski and the like. Alternatively, the three-dimensional element has a spherical, cubic, tetragonal or similar shape or an irregular shape.

Finally, in the present description, the term "macroscopic element" refers to an element or object whose dimensions are such as to be easily detected visually with the naked eye without the aid of devices. Preferably, the smaller dimension of the macroscopic element is greater than or equal to 0.5 mm.

Layered Structure

Figure 1B:
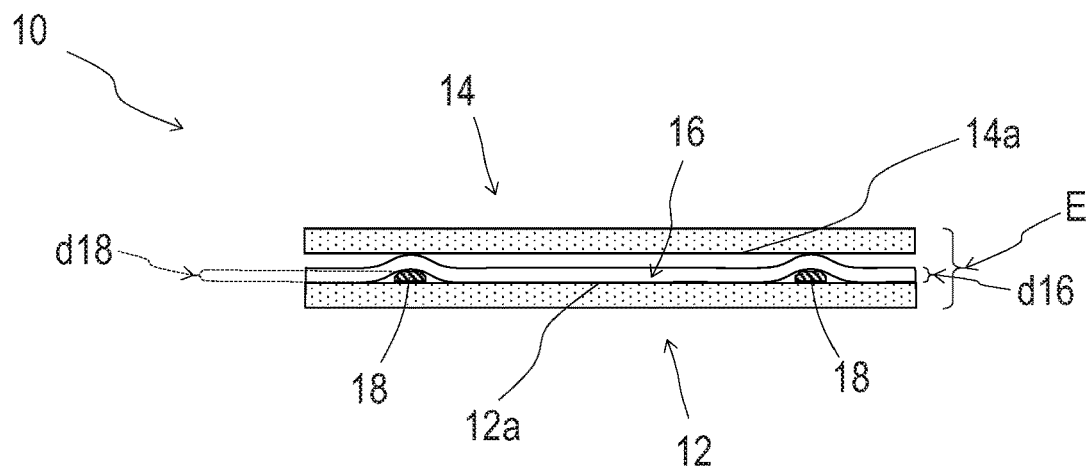
FIG. 1B is a cross section of the layered structure of FIG. 1A, taken along a longitudinal axis, in an arranged state for implementing a forming method, according to the present invention.
Figure 1C:
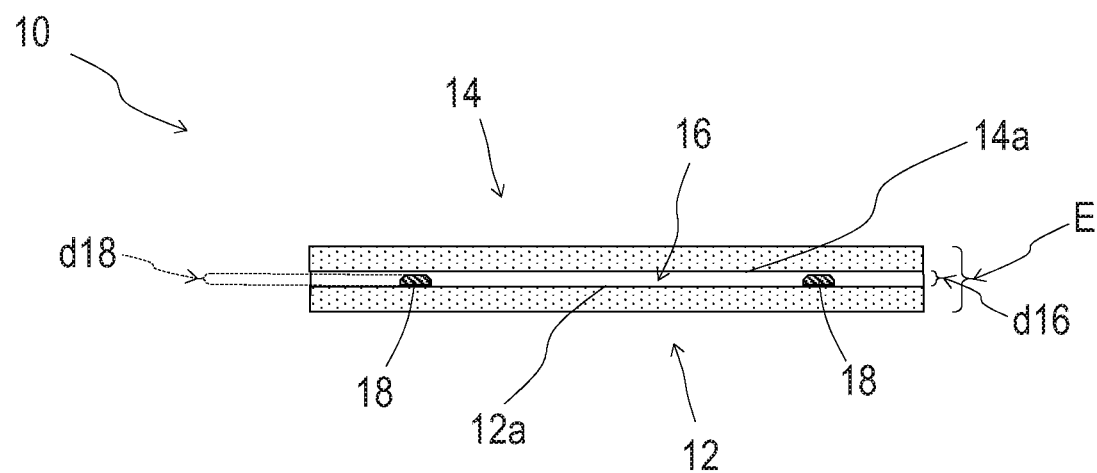
FIG. 1C is a cross section of the layered structure of FIG. 1A, taken along a longitudinal axis of the same, in a formed state following the forming method, according to the present invention.

With reference to FIGS. 1A, 1B and 1C, a layered structure 10 is shown in the preferred embodiment of the present invention. Specifically, FIG. 1A is an exploded schematic view of the components included in the layered structure 10, while FIG. 1B is a cross section of the layered structure of FIG. 1A, taken along a longitudinal axis thereof, in an initial state arranged for implementing a forming method according to the present invention. Finally, FIG. 1C is a cross section of the layered structure of FIG. 1A, taken along a longitudinal axis thereof, after having been formed by means of the forming method according to the present invention.

The layered structure 10 comprises a first support layer 12 and a second support layer 14, preferably planar, between which is interposed an adhesive intermediate layer 16 adapted to fix the layers to each other. Specifically, the first support layer 12 has a thickness d12 preferably equal to the thickness d14 of the second support layer 14, and the intermediate layer 16 has a thickness d16.

In the preferred embodiment of this invention, the first layer 12 and the second layer 14 are layers of common glass, or of other material, having a flat configuration. While the intermediate layer 16 is formed by a transparent Ethylene-Vinyl-Acetate copolymer (EVA), having a thickness d16 compatible with the thickness of the macroscopic three-dimensional element to be embedded, as explained below, and preferably comprised between 1 and 30 mm. Preferably, EVA has a content of vinyl-acetate comprised between 5 and 40%, wherein the melting temperature Tm is generally comprised between 105 and 60° C. In the most preferred embodiment EVA has a melting temperature Tm of about 90° C.

Figure 1D:
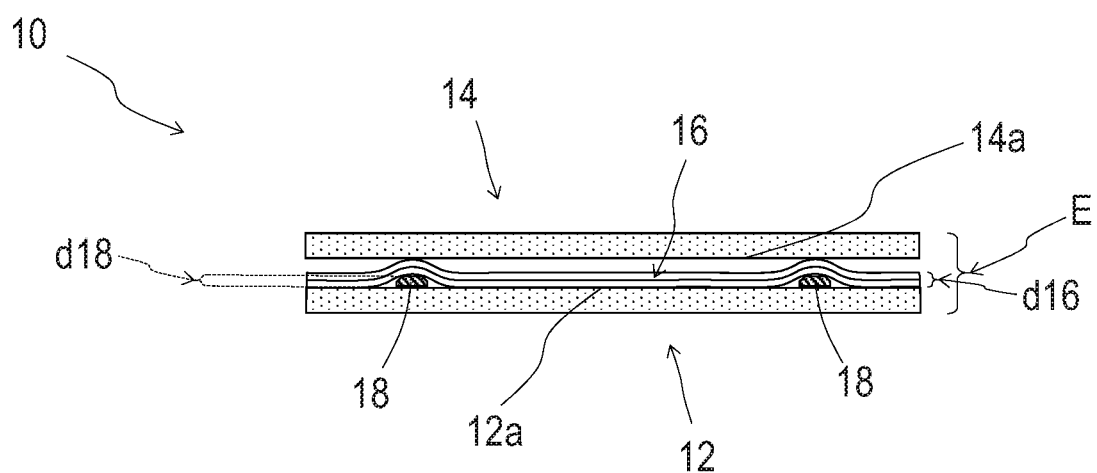
FIG. 1D is a cross section of a layered structure, in a further embodiment, in an arranged state for implementing the forming method, according to the present invention.

In the present invention, advantageously, the intermediate layer 16 can be formed by a single layer of EVA or, as shown in FIG. 1D, by a plurality of EVA layers superimposed on each other so as to form the thickness d16 adapted to embed three-dimensional macroscopic elements, as explained below. In other words, advantageously, it is possible to adjust in a wide range the thickness d16 of the intermediate layer 16 by superimposing on each other a plurality of intermediate layers.

Still referring to FIGS. 1A, 1B and 1C, on a first internal surface 12a of the first layer 12, adapted to adhere to the intermediate layer 16, are applied one or more three-dimensional macroscopic elements 18 made of crystal glass or precious stones, such as rhinestone, gems, diamonds and the like. Specifically, the three-dimensional macroscopic elements 18 are arranged, with a specific orientation, according to a preset pattern, that is according to a design, so as to form a geometrical shape, an inscription, a drawing, or are randomly arranged within a determined interval. In FIG. 1A, the three-dimensional macroscopic elements 18 are arranged at the apexes of a quadrilateral, however this arrangement is not limitative. Moreover, the three-dimensional macroscopic elements 18 are adapted to be operatively embedded within the intermediate layer 16, while a second internal surface 14a of the second layer 14 is adapted to adhere to the intermediate layer 16.

A height d18 of the three-dimensional macroscopic element 18, that is, its dimension along the direction perpendicular to the first internal surface 12a of the first layer 12 on which it operatively rests, is less than the thickness d16 of the intermediate layer 16 that embeds it (see FIGS. 1B, 1C and 1D). In the present invention, the smaller dimension between the height, the width and the length of the three-dimensional macroscopic element 18 is greater than or equal to 0.5 mm, that is, it is such as to be easily detected with the naked eye without the aid of devices.

In the preferred embodiment of this invention, a three-dimensional macroscopic element 18 is an object formed with crystal glass also having a polyhedral configuration. However, this embodiment is not limitative, and the three-dimensional element 18 can be a diamond, a mineral, a precious stone, a rhinestone, a metallic or polymeric object, or similar, having an appropriate cut, such as a diamond cut, Swarovski and the like. Alternatively, the three-dimensional macroscopic element 18 has a spherical, cubic, tetragonal or similar shape or an irregular shape.

Thus, after having been arranged as shown in FIG. 1B, the "sandwiched" layered structure 10 comprises the first layer 12 and the second layer 14, containing the intermediate layer 16 and the three-dimensional macroscopic elements 18, and an open peripheral edge E.

It is evident that, in further embodiments, it is possible to provide a layered structure 10 comprising at least two intermediate layers 16, one of which embedding at least one three-dimensional macroscopic element 18, each of which is interposed between a respective first layer 12 and a respective second layer 14 so as to form a multilayer wherein there is an alternation between a glass layer and an intermediate EVA layer.

Method

Hereunder is now described a method for making a layered structure 10, according to the present invention.

The initial steps of the method are carried out to prearrange the layered structure 10 as shown in FIG. 1B, or as shown in FIG. 1D in the case in which the intermediate layer 16 is formed by a pile of layers having the thickness d16, as described below.

Step a0)

Firstly, the first layer 12 and the second layer 14 are cleaned, washed and dried to eliminate the risk of low adhesiveness of the layers of the product. Specifically, the cleaning is adapted to prevent an incorrect adhesive action of the material with which the intermediate layer 16, preferably EVA, is formed, on the first internal surface 12a of the first layer 12 and on the second internal surface 14a of the second layer 14.

Step a1)

Afterwards, one or more three-dimensional macroscopic elements 18 are applied on the first internal surface 12a of the first layer 12, arranging them so as to form an appropriate preset pattern, that is according to a design, thus obtaining a geometrical shape, an inscription, a drawing or similar, or are randomly arranged, within a specified interval.

In this step, preferably, it may be possible to use a gluing substance to fix the three-dimensional macroscopic elements 18 to the first internal surface 12a of the first layer 12. In this state is guaranteed the maintenance of the arrangement of the three-dimensional macroscopic elements 18, in accordance with the preset pattern, even when the thickness d16 of the intermediate layer 16 is much greater than the height d18 of the three-dimensional macroscopic elements 18, which is the case in which it is more probable that they become displaced. The gluing substance that may be used is preferably a UV-curing glue which is, also, transparent and has preferably a refraction index similar to the material with which the intermediate layer 16 is formed, so as to avoid an optical discontinuity induced by the refraction of the light radiation.

Step a2)

Then, an intermediate layer 16 is laid on the first internal surface 12a of the first layer 12 and on the three-dimensional macroscopic elements 18, covering them. In this state, the intermediate layer 16, generally flexible, covers and is in contact with the first internal surface 12a in areas far from the three-dimensional macroscopic elements 18 and, in correspondence of the latter, it is in contact only with a portion of the whole surface area of each of the three-dimensional macroscopic elements 18 leaving a separating gap, containing air, around them. In other words, in correspondence of a separating gap the intermediate layer 16 is suspended and it is not in contact with the first internal surface 12a nor with the three-dimensional macroscopic element 18.

In this step, it may be advantageously possible to superimpose on the intermediate layer 16 additional intermediate layers, forming a pile, adapted to operatively form a single intermediate layer 16 having the thickness d16. The superimposition on each other of a plurality of distinct intermediate layers makes it possible to advantageously adjust the thickness d16 based on the height d18 of the three-dimensional macroscopic elements 18 that must be operatively embedded in the intermediate layer 16. However, as previously mentioned, the superimposition on one another of a plurality of intermediate layers increases the probability of forming additional separation gaps, containing air, between consecutive pairs of intermediate layers and in correspondence of the three-dimensional macroscopic elements 18.

Step a3)

Afterwards, the second layer 14 is applied on the intermediate layer 16, that is on the pile of intermediate layers 16, so as to arrange the layered structure 10 as shown in FIG. 1B, or as shown in FIG. 1D when the intermediate layer 16 is formed by a plurality of layers. In this state, the second internal surface 14a of the second layer 14 is in contact with the intermediate layer 16 at the three-dimensional macroscopic elements 18 and, far from the latter, it forms further separation gaps, containing air.

Step a4)

In the case in which the intermediate layer 16 protrudes from the layers, any excess is removed and, preferably, the whole peripheral edge E of the prearranged layered structure 10 is closed with air-permeable closing means (not shown in the figures). Advantageously, this makes it possible to contain within the layered structure 10 the material of the intermediate layer 16 when it melts, as described below, and at the same time allows the air to be extracted therefrom.

Preferably, the air-permeable closing means are formed by a tape permeable to air, or by a tape not permeable to air that is applied so as to leave open some small portions of the of the peripheral edge E. In this state, the closure of the peripheral edge E is achieved so as to allow a gaseous communication between the outside of the layered structure 10 and the space defined by the first layer 12 and by the second layer 14, wherein is contained the intermediate layer 16 or the plurality of layers that form the intermediate layer 16.

If need be, in this step it is possible to use a spacer, o a plurality of spacers of equal size, to be removably applied at the peripheral edge E of the layered structure 10 to achieve one or more abutting elements (not shown in the figures). These spacers are adapted to guarantee a minimum distance between the first internal surface 12a and the second internal surface 14a that is equal to the thickness d16 of the intermediate layer 16. Advantageously, these spacers make it possible to prevent the arranged layered structure 10 from taking on, at the end of the forming process, a shape wherein the first layer 12 and the second layer 14 are not parallel, and also prevent their bending due to the effect of a pressure applied during the forming process, causing a likely breaking of the same.

The method described to this point, provides for an intermediate layer 16 interposed between the first layer 12 and the second layer 14, although it is clear that, in further embodiments, it is possible to provide a layered structure 10 comprising at least two intermediate layers 16, wherein at least one embeds at least one three-dimensional macroscopic element 18, each of which is interposed between a respective first layer 12 and a respective second layer 14, so as to achieve a multilayer wherein there is an alternation between glass and EVA intermediate layer. In this case, therefore, it is possible to repeat the steps a0) to a4) until the layered structure 10 is obtained according to the design.

Figure 2:
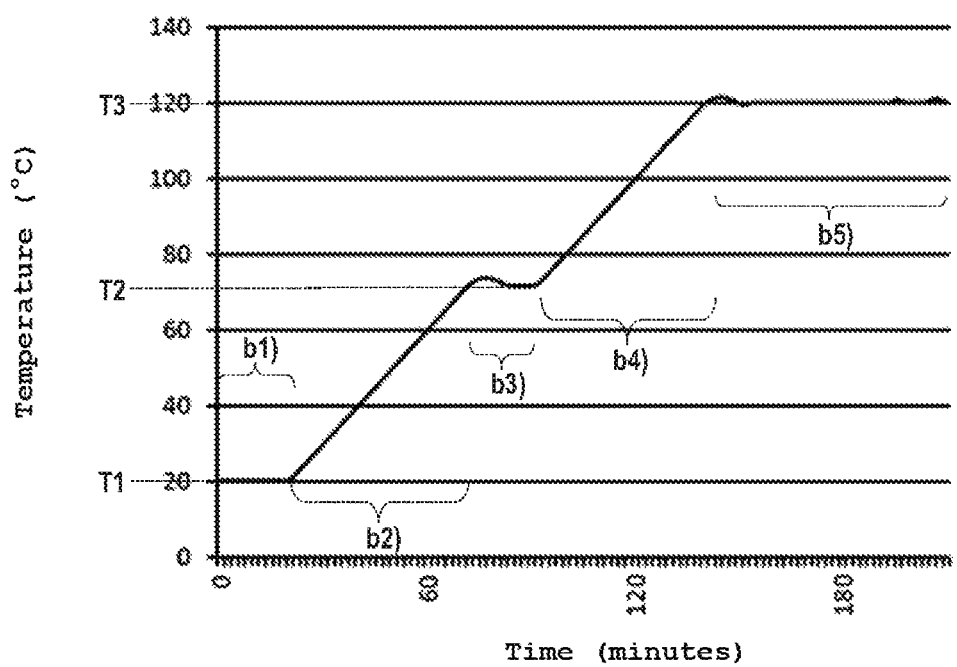
FIG. 2 is a graph showing a heating program according to a first embodiment of the forming method of the present invention.

Afterwards, the layered structure 10, so arranged, is inserted in an oven to obtain a heat treatment under vacuum that includes heating and temperature maintenance phases, according to appropriate experimental conditions as described below with reference to FIG. 2.

Step b1)

Firstly, the layered structure 10 is subjected to a vacuum comprised between −0.700 and −0.999 bar at a first temperature T1 comprised between 10° C. and Tm−30° C. In the preferred embodiment, in which EVA has a melting temperature Tm of 90° C., the first temperature T1 is comprised between 10 and 60° C. The formation of the vacuum makes it possible, advantageously, to remove any air present in the separation gaps between the intermediate layer 16, the first layer 12, the second layer 14 and the three-dimensional macroscopic elements 18.

Preferably, in this stage the layered structure 10 is subjected to a vacuum comprised between −0.900 and −0.999 bar at a first temperature T1 of 20° C., for a period of 20 minutes.

In this stage the vacuum is generated with suitable devices. In the preferred embodiment of the present invention, the layered structure 10 is inserted into a sealed bag, suitable also to withstand the maximum temperatures of the forming process, in which the vacuum is achieved by means of suitable pumping means, such as vacuum pumps. The material with which the bag is formed is flexible and it is preferably silicone.

Advantageously, when the vacuum is generated, the sealed bag exerts through its flexible walls a pressure on the first layer 12 and/or on the second layer 14 which is evenly distributed on the surfaces of the layered structure 10, unlike a traditional calendering process. In this manner, a homogeneous extraction of the air is advantageously favoured in this stage and in the subsequent stages, thus also making it possible to adapt the position, that is, the relative inclination, of the first layer 12 with respect to the second layer 14 based on the position of the separation gaps, containing air, and on their displacement during the procedure of forming the layered structure 10.

Step b2)

Afterwards, while the vacuum is maintained, the temperature is steadily increased with a heating rate between 1 and 10° C./min until a second temperature T2 between Tm−30° C. and Tm is reached, that is, in the preferred embodiment between 60 and 90° C.

Preferably, while the vacuum is maintained, in this step the temperature is steadily increased with a heating rate of 2° C./min until second temperature T2 between 70 and 75° C. is reached and, generally, these conditions are achieved in a time included between 20 and 60 minutes.

Step b3)

Then, while the vacuum is maintained, the second temperature T2 reached in the previous phase is maintained for at least 20 minutes. The adjustment of the temperature maintenance time in this phase varies principally based on the thickness d16 of the intermediate layer, on the number of layers that form the intermediate layer 16, and based on the thickness of the first layer 12 and of the second layer 14. In other words, the adjustment of the temperature maintenance time in this phase varies based on the total thickness of the layered structure 10.

Specifically, in this phase the intermediate layer 16 has reached a softening state such that the material of which it is formed, not yet melted, can be deformed by effect of the pressure exerted by the vacuum through the walls of the bag and by the weight of the second layer 14, and reduce the dimensions of the separation gaps so as to leave a sufficient time to allow the removal of the air from the separation gaps while their dimensions decrease.

Advantageously, by the succession of the steps b2) and b3), it is possible to effectively remove substantially all the air contained in the separation gaps, while the material of the intermediate layer 16 becomes deformed and starts to cover the portions of the first layer 12, the second layer 14 and the three-dimensional macroscopic elements 18 that, previously, were not in contact with the intermediate layer 16. Specifically, the relatively low heating rate of step b2) guarantees a temperature uniformity and low deformation rates of the intermediate layer 16 so as to prevent air from becoming embedded in the intermediate layer 16 during its deformation, induced by the softening. Instead, the maintenance step b3) guarantees an effective removal of the air, while the dimensions of the separation gaps are reduced further.

Step b4)

Afterwards, while the vacuum is maintained, the temperature is steadily increased with a heating rate between 1 and 10° C./min until a third temperature T3, included between Tm and Tm+60° C., is reached, that is in the preferred embodiment between 90 and 150° C.

Preferably, while the vacuum is maintained, in this step the temperature is steadily increased with a heating rate of 2° C./min until a third temperature T3, included between 120 and 135° C., is reached. However, in the case in which in step a1) a gluing substance was used, such as for example a UV-curing glue, in this step the third temperature should not exceed the degradation temperature of the gluing substance; for example, for a UV-curing glue the temperature must not exceed 120° C.

Step b5)

Then, while the vacuum is maintained, the third temperature T3, reached in the previous step, is maintained for at least 80 minutes. The adjustment of the temperature maintenance time in this step varies principally on the basis of the thickness d16 of the intermediate layer, the number of layers that form the intermediate layer 16, and on the basis of the thickness of the first layer 12 and of the second layer 14. In other words, the adjustment of the temperature maintenance time in this step varies on the basis of the total thickness of the layered structure 10.

Advantageously, by the succession of the steps b4) and b5), it is possible to effectively remove substantially all the air contained in the separation gaps, while the material of the intermediate layer 16 flows so as to cover the portions of the first layer 12, the second layer 14 and the three-dimensional macroscopic elements 18 that, previously, were not completely in contact with the intermediate layer 16.

Specifically, in step b4) the intermediate layer 16 reaches a state in which the material with which it is formed is molten and can flow, like a viscous fluid, by effect of the pressure exerted by the vacuum through the walls of the bag and by the weight of the second layer 14 so as to fill the separation gaps.

Advantageously, the relatively low heating rate of step b4) guarantees a temperature uniformity and low heating rates of the molten material of the intermediate layer 16 so as to leave a sufficient time to allow the removal of residual air from the separation gaps while the viscosity of the molten material decreases as the temperature increases.

Moreover, in step b5) are obtained the so-called "curing" experimental conditions of the material of the intermediate layer 16. The curing process is adapted to provide the appropriate mechanical and optical characteristics that influence the quality of the layered structure 10. Specifically, the relatively low heating rate of step b4) and the maintenance for long periods of the third temperature T3 reached in step b5) guarantee a temperature uniformity and a viscosity of the molten material such as to obtain the required optical characteristics, such as transparency, and to eliminate any tensioning stresses that may be induced in the previous stages.

Step b6)

Finally, the layered structure 10 is allowed to stabilize until the room temperature is reached, by turning off the oven, or by setting a suitable cooling temperature, such as for example a temperature comprised between 20 and 25° C., and also by interrupting the application of the vacuum.

At the end of the process the air-permeable closing means, that is the air-permeable tape, and any spacers are removed from the peripheral edge E of the layered structure 10, which then can be put through further processes based on the usage application.

It is clear that various modifications to the previously described method for making the layered structure 10 are possible.

Figure 3:
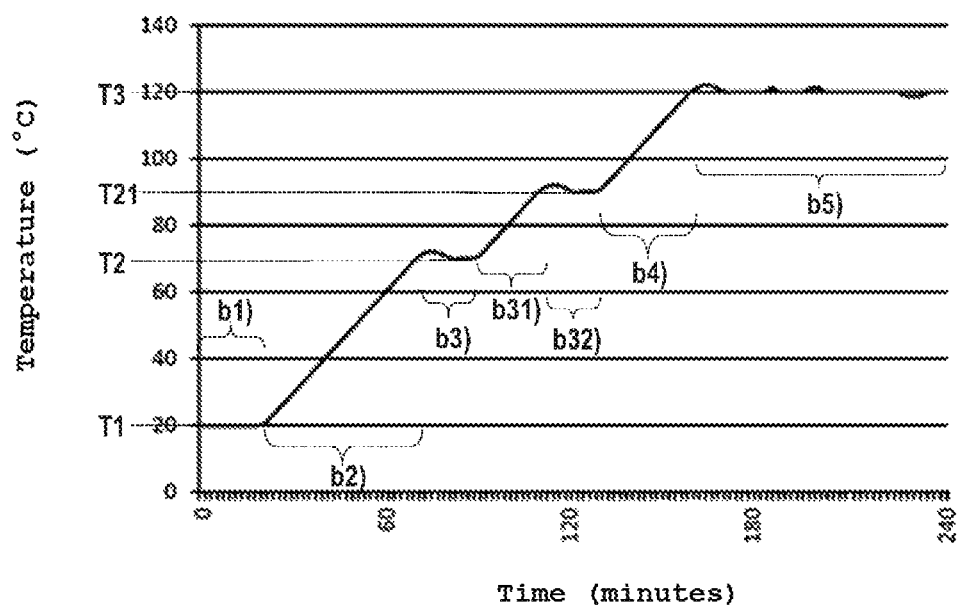
FIG. 3 is a graph showing a heating program according to a second embodiment of the forming method of the present invention.

In fact, it is possible to provide a method in a second embodiment of the present invention wherein the layered structure 10 is subjected to a heat treatment, under vacuum, substantially similar to the one of the first embodiment, wherein further steps are inserted. Specifically, after step b3) and before step b4), described above, the method in the second embodiment comprises a further heating step b31) and temperature maintenance step b32) that are carried out in suitable experimental conditions, as described below with reference to FIG. 3.

Step b31)

While the vacuum is maintained, after step b3) previously described, the temperature is steadily increased with a heating rate comprised between 1 and 10° C./min until an intermediate temperature T21 between Tm−20° C. and Tm+20° C. is reached, that is, in the preferred embodiment between 70° C. and 110° C.

Preferably, while the vacuum is maintained, in this step the temperature is steadily increased with a heating rate of 2° C./min until an intermediate temperature T21 of 90° C. is reached and, generally, these conditions are obtained in a time comprised between 20 and 60 minutes.

Step b32)

Then, while the vacuum is maintained, the intermediate temperature T21, reached in the previous step, is maintained for at least 20 minutes. The adjustment of the temperature maintenance time in this step varies mainly on the basis of the thickness d16 of the intermediate layer, the number of layers that form the intermediate layer 16, and on the basis of the thickness of the first layer 12 and of the second layer 14. In other words, the adjustment of the temperature maintenance time in this step varies on the basis of the total thickness of the layered structure 10.

Advantageously, by the succession of steps b31) and b32) it is possible to further effectively remove air contained in the separation gaps while the material of the intermediate layer 16, that starts to melt, can flow by the effect of the pressure exerted by the vacuum through the walls of the bag and by the weight of the second layer 14 so as to begin to fill the separation gaps.

Specifically, the relatively low heating rate of step b31) guarantees a temperature uniformity and low flow rates of the molten material of the intermediate layer 16, so as to leave a sufficient time to allow the removal of air from the separation gaps while the viscosity of the molten material decreases as the temperature increases. Moreover, step b32) makes it possible to start to remove the tensioning stresses that may have been induced in the preceding steps, which will then be completed in the subsequent steps.

Afterwards, the method proceeds with step b4), in a manner similar to what was previously described with reference to the first embodiment.

Hereinbelow will now be given some results relative to layered structures 10, embedding three-dimensional macroscopic elements 18, formed by means of the previously described method, in particular in its first embodiment.

In Table 1 are shown parameters relative to the samples of layered structures 10, and in Table 2 are shown results of the tests carried out on the layered structures 10 of Table 1. Specifically, the tests are relative to the formation of air bubbles, the formation of tensioning stresses, the degree of transparency, the position of the three-dimensional macroscopic elements 18 and the mechanical properties of the layered structures 10 formed with the method according to the present invention.

The verification of the formation of air bubbles is carried out by evaluating their absence from the intermediate layer 16 and from the separation surface between the three-dimensional macroscopic element 18 and the intermediate layer 16. In Table 2 an absence of air bubbles is indicated with O while their presence is indicated with X.

The verification of the formation of tensioning stresses in the layered structure 10 is carried out by evaluating the absence of cracking or rift in the first layer 12 and/or, in the second layer 14 and/or in the intermediate layer 16 during the forming process and following a stabilization of the product at room temperature for 24 hours. In Table 2, an absence of cracking is indicated with O while their presence is indicated with X.

The verification of the degree of transparency of the layered structure 10 is carried out visually. In Table 2 an acceptable transparency is indicated with O, while an unacceptable transparency is indicated with X.

The verification of the position of the three-dimensional macroscopic element 18 in the layered structure 10 is carried out visually by checking, after the forming process, for a displacement from the preset position, indicated with a marker on one of the glass layers. In Table 2, an unaltered position is indicated with O, an acceptable displacement within an interval of 1 mm is indicated with Y, while an unacceptable displacement is indicated with X.

The verification of the mechanical properties of the layered structure 10 is carried out according to EN 12600:2004 for a product of class 1(B)1. In Table 2, an acceptable mechanical property is indicated with O, while a mechanical property that is not acceptable is indicated with X.

TABLE 1

| Sample n. | Thickness of glass layers 12 and 14, (d12, d14) [mm] | Thickness of intermediate EVA layer 16 (d16) [mm] | Height of three-dimensional crystal glass element 18 (d18) [mm] | Use of a gluing substance? |
|---|---|---|---|---|
| 1 | 6 | 3.04 (4 layers of 0.76) | 2.7 | No |
| 2 | 6 | 3.04 (4 layers of 0.76) | 2.7 | Yes |
| 3 | 6 | 3.8 (5 layers of 0.76) | 2.7 | No |
| 4 | 6 | 3.8 (5 layers of 0.76) | 2.7 | Yes |
| 5 | 6 | 4.56 (6 layers of 0.76) | 2.7 | No |
| 6 | 6 | 4.56 (6 layers of 0.76) | 2.7 | Yes |

TABLE 2

| Sample n. | Air bubbles | Tensioning stresses | Transparency | Position | Mechanical properties |
|---|---|---|---|---|---|
| 1 | O | O | O | Y | O |
| 2 | O | O | O | O | O |
| 3 | O | O | O | Y | O |
| 4 | O | O | O | O | O |
| 5 | O | O | O | Y | O |
| 6 | O | O | O | O | O |

The results collected in Tables 1 and 2 show that the layered structures 10 formed with the method of the present invention do not embed air bubbles, do not evidence residual tensioning stresses after the forming process, have an adequate degree of transparency, meet the positioning requirements of the three-dimensional macroscopic elements 18, and guarantee mechanical properties in agreement with field regulations.

Specifically, the best results were obtained with samples 2, 4 and 6, wherein the use of a gluing substance in step a1) guarantees the immobility of the three-dimensional macroscopic elements 18 and, consequently, excellent characteristics of the layered structures 10.

Moreover, it is evident that, with the previously described method, it is possible to form layered structures 10 having a thickness d16 of the intermediate layer 16 which, advantageously, can be widely adjusted by superimposing on one another a plurality of layers, to appropriately embed the three-dimensional macroscopic elements 18 having relatively large dimensions, and maintaining, at the same time, the intermediate layer 16 free of air bubbles, transparent and free of tensioning stresses.

It is clear that different modifications can be carried out to the previously described layered structure 10 embedding the three-dimensional macroscopic elements 18. In fact, the three-dimensional macroscopic elements 18 can be objects of various shapes made with thermoplastic resins that do not melt at the maximum temperatures reached during the forming method.

In addition, the first layer 12 and the second layer 14 in the preferred embodiment are formed with common glass, although it is possible to provide that at least one of the two layers is formed with a metallic or a ceramic material, such as marble, granite or the like, or is formed with a thermoplastic resin, preferably transparent, that does not melt at the maximum temperatures reached during the forming method.

From the descriptions given heretofore, it is evident that important results have been achieved, overcoming the drawback of the prior art, making it possible to develop a method whereby a layered structure 10 can be obtained, such as for example a layered glass, embedding decorative and/or functional three-dimensional macroscopic elements 18 made of crystal glass or precious stones, which is adapted to prevent the formation of defects that cause the deterioration of the decorative, optical, functional and mechanical characteristics of the product.

In fact, the method of the present invention makes it possible to obtain a layered structure 10 in which the thickness d16 of the intermediate layer 16 can be adjusted so as to adequately embed the three-dimensional macroscopic elements 18 without embedding air. Specifically, the adjustment of the thickness d16 of the intermediate layer 16 is obtained by superimposing a plurality of distinct layers based on the height d18 of the three-dimensional macroscopic elements 18 that are to be operatively embedded. The method of the present invention makes it possible, advantageously, to inhibit the formation of air bubbles that, otherwise, would very probably form if a plurality of layers were stacked on one another to form the intermediate layer 16.

The product thus formed does not imply defects that could deteriorate the decorative, optical or functional characteristics of the three-dimensional macroscopic elements 18, and the optical quality of the intermediate layer 16, such as transparency, is in accordance with the requirements of the applications.

Moreover, despite the presence of three-dimensional macroscopic elements 18 in the layered structure 10, this does not imply tensioning stresses and provides adequate mechanical properties.

Finally, during the forming process, the three-dimensional macroscopic elements 18 maintain, within an acceptable interval, the position established according to the design of the layered structure and, if need be, it is possible to ensure their immovability by means of gluing substances.

Naturally, the materials and the equipment used to implement the present invention, as well as the form and dimensions of the individual components, can be the most suitable according to the specific requirements.

The invention claimed is:

1. A method for making a layered structure comprising a first support layer, a second support layer, and an adhesive intermediate layer interposed between the first layer and the second layer which is adapted to fix the first and second layer to each other, the intermediate layer operatively embedding at least one three-dimensional macroscopic element made of crystal glass or precious stones, and the intermediate layer being made of a thermoplastic resin having a melting temperature (Tm), the method comprising the steps of:
- a1) applying the at least one three-dimensional macroscopic element on a surface of the first layer,
- a2) laying the intermediate layer on the first layer and the at least one three-dimensional macroscopic element,
- a3) applying the second layer on the intermediate layer thus forming an arranged layered structure,
- b1) applying a vacuum to the layered structure between −0.700 and −0.999 bar at a first temperature of between 10° C. and (Tm minus 30° C.),
- b2) increasing the temperature with a heating rate of between 1 and 10° C./min to a second temperature of between (Tm minus 30° C.) and Tm in order to soften the intermediate layer, while also maintaining the vacuum of step b1),
- b3) maintaining the second temperature for at least 20 minutes to stabilize the intermediate layer while also maintaining the vacuum of step b1),
- b4) increasing the temperature with a heating rate of between 1 and 10° C./min reaching a third temperature of between Tm and Tm+60° C. in order to melt the intermediate layer, while also maintaining the vacuum of step b1),
- b5) maintaining the third temperature for at least 80 minutes to stabilize the intermediate layer while also maintaining the vacuum of step b1).

2. The method for making the layered structure according to claim 1, further comprising, after step b3) and before step b4), the steps of:
- b31) increasing the temperature with a heating rate of between 1 and 10° C./min to an intermediate temperature of between (Tm minus 20° C.) and Tm+20° C. in order to start melting the intermediate layer, while also maintaining the vacuum of step b1),
- b32) maintaining the intermediate temperature for at least 20 minutes to stabilize the intermediate layer, while also maintaining the vacuum of step b1).

3. The method for making the layered structure according to claim 1, wherein in step a2) the intermediate layer is formed by a plurality of distinct intermediate layers superimposed to each other so as to create a thickness adapted to operably embed the at least one three-dimensional macroscopic element.

4. The method for making the layered structure according to claim 1, wherein the thermoplastic resin is ethylene-vinyl-acetate copolymer (EVA).

5. The method for making the layered structure according to claim 4, wherein the Tm is about 90° C. for the EVA.

6. The method for making the layered structure according to claim 4, wherein the heating rate in step b31) is 2° C./min and is maintained until reaching the intermediate temperature, which is 90° C.

7. The method for making the layered structure according to claim 4, wherein in step b1), the vacuum is between −0.900 and −0.999 bar and the first temperature is 20° C., and each is maintained for a time of 20 minutes.

8. The method for making the layered structure according to claim 4, wherein the heating rate in step b2) is 2° C./min and is maintained until reaching the second temperature, which is between 70 and 75° C.

9. The method for making the layered structure according to claim 4, wherein the heating rate in step b4) is 2° C./min and is maintained until reaching the third temperature, which is between 120 and 135° C.

10. The method for making the layered structure according to claim 1, wherein in step b1), obtaining the vacuum by inserting the layered structure in a sealed bag with flexible walls resistant to the third temperature, and connecting the sealed bag to a pumping means adapted to make the vacuum.

11. The method for making the layered structure according to claim 1, further comprising, in step a2), fixing the at least one three-dimensional macroscopic element on the surface of the first layer by means of a gluing substance.

12. The method for making the layered structure according to claim 1, further comprising, after step a3) and before step b1), removably closing a peripheral edge of the arranged layered structure by means of an air-permeable closing means.

13. The method for making the layered structure according to claim 1, further comprising, before said step b1), applying a removable spacer at a peripheral edge within the arranged layered structure to ensure a minimum distance between the first layer and the second layer equal to a thickness of the intermediate layer.

* * * * *